Feb. 7, 1928.
M. HENDRICKSON
1,658,164
MOTOR VEHICLE
Filed Aug. 5, 1926   3 Sheets-Sheet 2
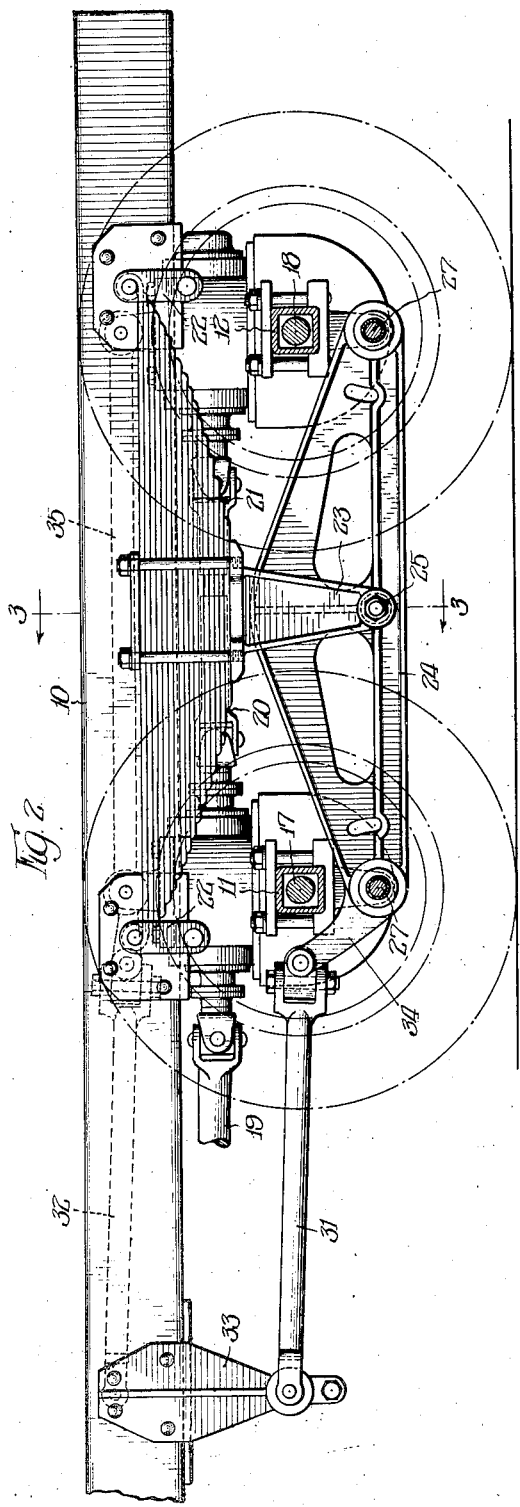
Inventor:
Magnus Hendrickson Feb. 7, 1928.
M. HENDRICKSON
MOTOR VEHICLE
Filed Aug. 5, 1926
1,658,164
3 Sheets-Sheet 3
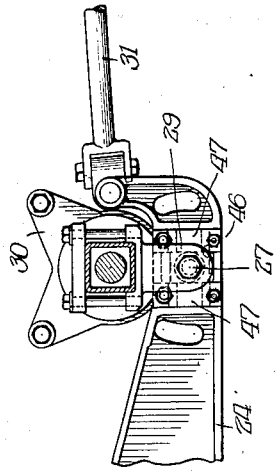
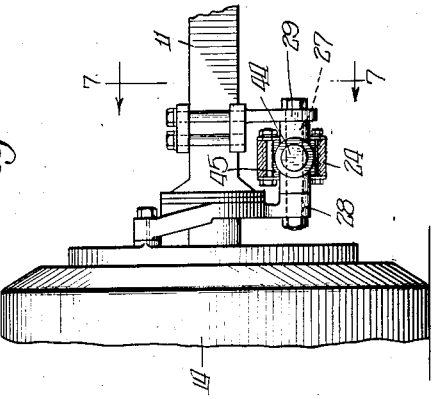
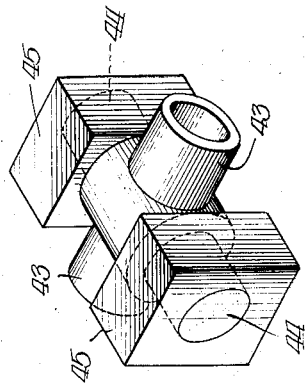
Inventor:
Magnus Hendrickson,
By Cromwell, Greist & Warden
Attys.

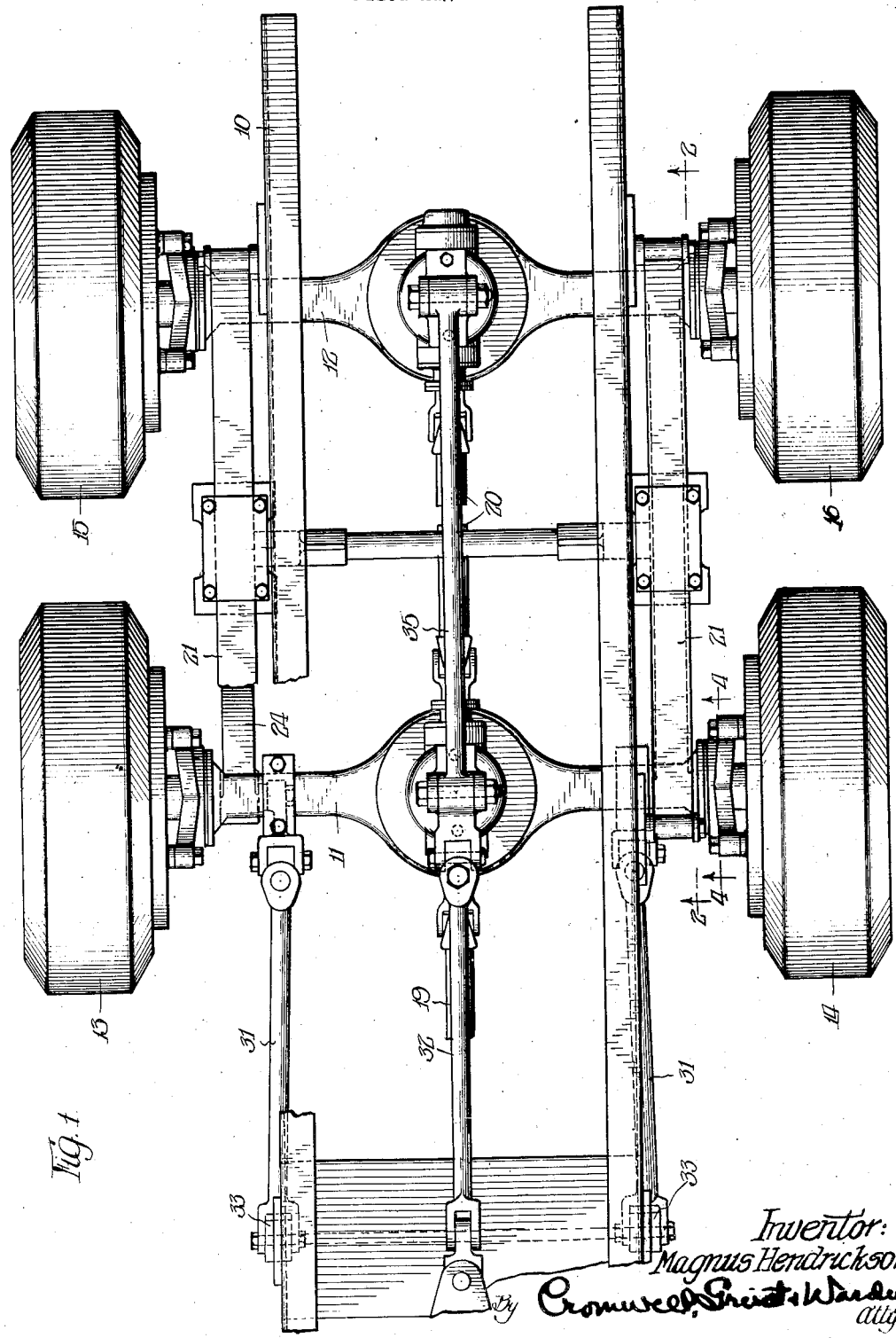

Patented Feb. 7, 1928.

1,658,164

UNITED STATES PATENT OFFICE.

MAGNUS HENDRICKSON, OF CHICAGO, ILLINOIS, ASSIGNOR TO HENDRICKSON MOTOR TRUCK COMPANY, OF CHICAGO, ILLINOIS, A CORPORATION OF ILLINOIS.

MOTOR VEHICLE.

Application filed August 5, 1926. Serial No. 127,269.

This invention has to do with heavy duty motor vehicles of the type equipped with four rear drive wheels.

The principal object of the invention is to provide an improved mounting for the four rear drive wheels of such a vehicle, which mounting permits the wheels to move up and down freely relative to each other, distributes the weight of the superposed vehicle equally between the wheels notwithstanding differences in the positions thereof, and counteracts the torsional stresses which in ordinary mountings cut down the traction of certain of the wheels during the starting and braking operations.

Other objects and advantages of the invention will be evident to those skilled in the art upon a full understanding of the novel construction, arrangement and operation of the mounting.

One form of the invention is presented herein for the purpose of exemplification, but it will of course be understood that the invention is susceptible of embodiment in other structurally different forms coming equally within the comprehensive scope of the appended claims.

In the drawings—

Fig. 1 is a plan view of the mounting;

Fig. 2 is a section taken on the line 2—2 of Fig. 1;

Fig. 3 is a section taken on the line 3—3 of Fig. 2;

Fig. 4 is a section taken on the line 4—4 of Fig. 1;

Fig. 5 is a section taken on the line 5—5 of Fig. 4;

Fig. 6 is a section corresponding to Fig. 4, but showing a modification;

Fig. 7 is a section taken on the line 7—7 of Fig. 6; and

Fig. 8 is a perspective view of certain of the parts incorporated in the modification shown in Figs. 6 and 7.

The mounting is used in association with a chassis 10, two rear axle housings 11 and 12 below the chassis, and four rear drive wheels 13, 14, 15 and 16 at the ends of the housings. The wheels are driven by live axles 17 and 18 journalled in the housings, and the axles are driven by propeller shafts 19 and 20. The shaft 19 is connected with a motor (not shown) on the chassis, and extends rearwardly therefrom into the housing 11, while the shaft 20 is connected to the rear end of the shaft 19 within the housing 11, and extends rearwardly therefrom into the housing 12.

The chassis is supported on two semi-elliptical leaf springs 21 through shackles 22 at the ends of the springs. The springs are provided intermediate their ends with downwardly extending brackets 23 which are bifurcated to receive two carrying beams 24. The beams preferably increase in thickness toward their medial points, and are pivoted on pins 25 at such points to the lower ends of the brackets. The ends of the beams 24 extend beneath the ends of the housings 11 and 12, and are connected by ball and socket joints 26 to pins 27 which are fixedly positioned beneath and relative to the housings by spaced clamps 28 and 29 carried by the same. The clamps 28 may advantageously be formed as downwardly extending integral portions of the usual brake spiders 30 at the ends of the housings.

The construction above described distributes the weight of the rear end of the chassis 10 equally between all four rear drive wheels, and any upward or downward movement of one or more of the wheels will not affect such equalization. Furthermore, the wheels are perfectly free to move up or down relative to each other in traveling over bumps or through depressions.

As the four rear drive wheels move upwardly and downwardly in conformity with the surface of the road, the housing 11 is prevented from tilting forwardly or rearwardly relative to the chassis by means of two lower radius rods 31 and a single upper torque rod 32. The rods 31 are pivoted at their front ends to two brackets 33 which extend downwardly from the sides of the chassis 10, and are pivoted at their rear ends to two extensions 34 on the front ends of the beams 24. The rod 32 is pivoted at its front end to the chassis at a point intermediate the brackets 33, and is pivoted at its rear end to the upper part of the housing 11. The lower side rods 31 and the upper middle rod 32 cooperate with the bracket 33 and the housing 11 to form what is in effect a parallelogram in which the front vertically spaced corner points are fixed, and such arrangement of course maintains the housing 11 at all times in an upright position parallel to the brackets 33 and perpendicular to the chassis 10, without in any way interfering with the free up and down movement of either or both ends of the housing 11. The rods 31 and 32 also assume all torsional stresses set up in the housing 11 during the starting and braking operations, and prevent such stresses from being transmitted by the housing 11 to the housing 12.

A somewhat similar arrangement is provided for preventing the housing 12 from tilting forwardly or rearwardly relative to the chassis during the up and down movement of the wheels. The carrying beams 24 correspond in function to the radius rods 31, and a torque rod 35 corresponds in function to the rod 32. The rod 35 is pivoted at its front end to the upper part of the housing 11 in line with the rod 32, and is pivoted at its rear end to a corresponding part of the housing 12. The lower beams 24 and the upper rod 35 cooperate with the vertical axes of the housings 11 and 12 to form another parallelogram in which the front side of the rear parallalogram is common with the rear side of the front parallelogram. As a result, the housing 12 is also prevented from tilting forwardly or rearwardly. The beams 24 and the rod 35, like the rods 31 and 32, assume all torsional stresses set up in the housing 12, and transmit such stresses to the rods 31 and 32, which in turn transmit the same to the chassis through the brackets 33.

The carrying beams 24 and the brackets 23 supported on the same are prevented from tilting toward or away from each other under shocks applied laterally to the wheels by the provision of a laterally disposed truss tube 36. A sleeve 37 is fixedly secured to one end of the tube 36, and is hinged on a vertical axis to the inner side of one of the brackets; and a similar sleeve 38 is slidably and rotatably mounted on the other end of the tube 36, and is hinged on a vertical axis to the inner side of the other bracket. The brackets 23, together with the springs 21 and the carrying beams 24, are permitted to move slightly toward or away from the sides of the chassis by reason of the sliding association of the sleeve 38 with the tube 36, but are effectively prevented by the hinge connections from tilting in either direction relative to the sides of the chassis.

The pivotal connections at the ends of the various members incorporated in the mounting are of such character as to render the mounting fully flexible in all necessary directions—the connections at the ends of the beams 24 being preferably of ball-and-socket form as previously described, those at the front and rear ends of the rods 31 being respectively of ball-and-socket and double pivot form, those at the front and rear ends of the rod 32 being of double pivot form, and those at the front and rear ends of the rod 35 being of ball-and-socket form.

The ball-and-socket joints 26 at the ends of the beams 24 may be of a construction wherein the pins 27 extend through the centers of balls 39 which fit between concave upper and lower bearing blocks 40 secured in apertures in the ends of the beams. The joints may be covered to retain lubricant and exclude dust during movement of the parts by side plates 41 which are pressed against the sides of the bearing blocks 40 by springs 42.

Instead of using the ball-and-socket joints 26 at the ends of the beams 24, the connections may be of the gimbal-joint construction shown in Figs. 6, 7 and 8, wherein the pin 27 extends through bearing sleeves 43 which are provided with pairs of aligned trunnions 44 at opposite sides thereof in general alignment with the longitudinal axes of the beams. The trunnions 44 extend into apertures in spaced blocks 45, and the blocks are inserted laterally into apertures 46 in the ends of the beams, where they are fixedly positioned flush with the sides of the beams by strips 47 which bear against the edges of the blocks and are bolted at points above and below the same to the beams.

It will be appreciated from the foregoing that, when four rear drive wheels are mounted on a motor vehicle in accordance with the invention, each of the wheels will be perfectly free to move upwardly and downwardly, and the two rear axle housings associated with the wheels will be prevented from tilting forwardly or rearwardly during the up and down movement of the wheels. Moreover, the weight of the rear end of the chassis will always be equally distributed between the four wheels regardless of the positions in which they may happen to be, and the traction forces will also always be equally distributed between the four wheels, inasmuch as the torsional stresses set up in the starting and braking operations will be effectively absorbed by the chasiss through the linkage arrangements provided and cannot be transmitted from one housing to the other.

I claim:

1. In a motor vehicle, the combination with a chassis, two rear axle housings supporting the chassis entirely from points beneath the axes of the housings, and four rear drive wheels supporting the ends of the housings, of means for permitting the wheels to move upwardly and downwardly relative to each other without changing the distribution of load as between the same, and seperate means comprising interconnections between the housings centrally thereof for preventing the housings from tilting forwardly or rearwardly relative to the chassis during the movement of the wheels.

2. In a motor vehicle, the combination with a chassis, two rear axle housings supporting the chassis entirely from points beneath the axes of the housings, and four rear drive wheels supporting the ends of the housings, of means for permitting the wheels to move upwardly and downwardly relative to each other, and separate means comprising interconnections between the housings centrally thereof for preventing the housings from tilting forwardly or rearwardly relative to the chassis during the movement of the wheels and also for preventing the torsional stresses set up by the starting and braking operations from decreasing the traction of certain of the wheels.

3. In a motor vehicle, the combination with a chassis, two rear axle housings, and four rear drive wheels supporting the ends of the housings, of two side brackets supporting the chassis, two side beams pivoted intermediate their ends to the brackets and pivoted at their ends to corresponding ends of the housings at points beneath the axes of the same for supporting the brackets in such a way as to permit the wheels to move upwardly and downwardly relative to each other, and means for preventing the housings from tilting forwardly or rearwardly relative to the chassis during such movement.

4. In a motor vehicle, the combination with a chassis, two rear axle housings, and four rear drive wheels supporting the ends of the housings, of two downwardly opening U-shaped side brackets, means interposed between the chassis and the brackets for resiliently supporting the former on the latter, two side beams of increasing thickness toward their centers pivoted at their centers between the spaced portions of the brackets and pivoted at their ends to corresponding ends of the housings for supporting the brackets in such a way as to permit the wheels to move upwardly and downwardly relative to each other, and means for preventing the housings from tilting forwardly or rearwardly relative to the chassis during such movement.

5. In a motor vehicle, the combination with a chassis, two rear axle housings, and four rear drive wheels supporting the ends of the housings, of two side brackets, two side springs connected intermediate their ends to the brackets and connected at their ends to the chassis, two side beams pivoted intermediate their ends to the brackets and pivoted at their ends to corresponding ends of the housings at points beneath the axes of the same for supporting the brackets in such a way as to permit the wheels to move upwardly and downwardly relative to each other, and means for preventing the housings from tilting forwardly or rearwardly relative to the chassis during such movement.

6. In a motor vehicle, the combination with a chassis, two rear axle housings, and four rear drive wheels supporting the ends of the housings, of two side brackets supporting the chassis, a cross connection between the brackets for preventing the same from tilting toward or away from each other, two side beams pivoted intermediate their ends to the brackets and pivoted at their ends to corresponding ends of the housings for supporting the brackets in such a way as to permit the wheels to move upwardly and downwardly relative to each other, and means to prevent the housings from tilting forwardly or rearwardly relative to the chassis during the up and down movement of the wheels.

7. In a motor vehicle, the combination with a chassis, two rear axle housings supporting the chassis, and four rear drive wheels supporting the ends of the housings, of means for permitting the wheels to move upwardly and downwardly relative to each other, one central upper and two lower members pivoted at their front ends to vertically spaced parts of the chassis and pivoted at their rear ends to vertically spaced parts of one of the housings to prevent that housing from tilting forwardly or rearwardly during up and down movement of the wheels, and one central upper and two lower members similarly pivoted between vertically spaced parts of both housings to likewise prevent the other housing from tilting forwardly or rearwardly, the one upper member in each set being disposed between the two lower members in each set, and the lower members in the first described set being connected intermediate their ends with the chassis.

8. In a motor vehicle, the combination with a chassis, two rear axle housings, and four rear drive wheels supporting the ends of the housings, of two side brackets supporting the chassis, two side beams pivoted intermediate their ends to the brackets with their ends beneath the ends of the housings, ball-and-socket joints between the ends of the beams and the ends of the housings to permit the ends of the housings to move upwardly and downwardly without corresponding movement of the opposite ends, and means for preventing the housings from tilting forwardly or rearwardly during such movement.

9. In a motor vehicle, the combination with a chassis, two rear axle housings, and four rear drive wheels supporting the ends of the housings, of two side brackets supporting the chassis, two side beams pivoted intermediate their ends to the brackets, universal joints between the ends of the beams and the ends of the housings at points beneath the axes of the housings to permit the ends of the housings to move upwardly and downwardly without corresponding movement of the opposite ends, and means for preventing the housings from tilting forwardly or rearwardly during such movement.

10. In a motor vehicle, the combination with a chassis, two rear axle housings, and four rear drive wheels supporting the ends of the housings, of two side brackets supporting the chassis, two side beams pivoted intermediate their ends to the brackets and pivoted at their ends to corresponding ends of the housings for supporting the brackets in such a way as to permit the wheels to move upwardly and downwardly relative to each other, and means for preventing the housings from tilting forwardly or rearwardly relative to the chassis during such movement, the pivotal connections between the brackets and the side beams being located at points below the level of the axes of the housings, and the pivotal connections between the side beams and the housings being also located at points below the level of the axes of the housings.

11. In a motor vehicle, the combination with a chassis, two rear axle housings, and four rear drive wheels supporting the ends of the housings, of two side brackets, two side springs connected intermediate their ends to the brackets and connected at their ends to the chassis, two side beams pivoted intermediate their ends to the brackets and pivoted at their ends to corresponding ends of the housings, and a cross member hinged at its ends to the side brackets on vertical axes for preventing the brackets from tilting toward or away from each other.

12. In a motor vehicle, the combination with a chassis, two rear axle housings, and four rear drive wheels supporting the ends of the housings, of two side brackets, two side springs connected intermediate their ends to the brackets and connected at their ends to the chassis, two side beams pivoted intermediate their ends to the brackets and pivoted at their ends to corresponding ends of the housings, and a cross connection between the side brackets for preventing the same from tilting toward or away from each other, said connection consisting of a truss tube hinged at one end to one of the brackets on a vertical axis, and a sleeve slidably telescoping with the truss tube and hinged at one end to the other bracket on a vertical axis.

In testimony whereof I have hereunto subscribed my name.

MAGNUS HENDRICKSON.